United States Patent

Guenthert et al.

[11] 4,264,488
[45] Apr. 28, 1981

[54] COLORING OF THERMOPLASTICS

[75] Inventors: Paul Guenthert, Schifferstadt; Georg Henning, Ludwigshafen, both of Fed. Rep. of Germany

[73] Assignee: BASF Aktiengesellschaft, Fed. Rep. of Germany

[21] Appl. No.: 84,870

[22] Filed: Oct. 15, 1979

[30] Foreign Application Priority Data

Oct. 17, 1978 [DE] Fed. Rep. of Germany ....... 2845073

[51] Int. Cl.³ .............................................. C08K 5/00
[52] U.S. Cl. ................................................. 260/42.21
[58] Field of Search ............................ 260/42.21, 202

[56] References Cited

U.S. PATENT DOCUMENTS

| | | | |
|---|---|---|---|
| 2,225,665 | 12/1940 | Siegel | 260/202 |
| 2,765,300 | 10/1956 | Hein et al. | 260/202 |
| 2,821,525 | 1/1958 | Waitkins et al. | 260/202 |
| 4,115,377 | 9/1978 | Putney | 260/42.21 |

Primary Examiner—Lewis T. Jacobs
Attorney, Agent, or Firm—Oblon, Fisher, Spivak, McClelland & Maier

[57] ABSTRACT

The use of a compound of the general formula I

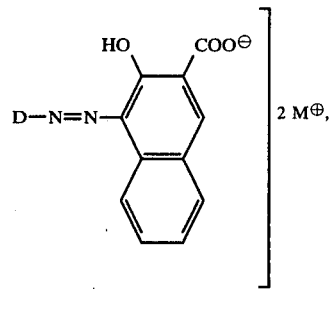

where D is a radical of one of the formulae II a–c

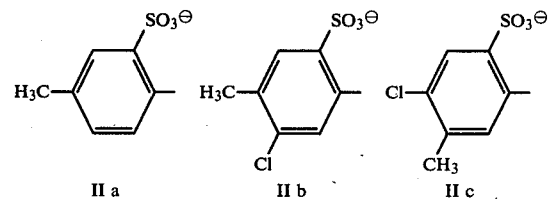

and $M^\oplus$ is $Li^\oplus$, $Na^\oplus$, $K^\oplus$ or $NH_4^\oplus$, for coloring of thermoplastics.

The colorations obtained are surprisingly fast.

4 Claims, No Drawings

COLORING OF THERMOPLASTICS

The present invention relates to the use of a compound of the general formula I

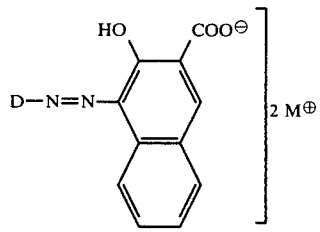

where D is a radical of one of the formulae II a—c

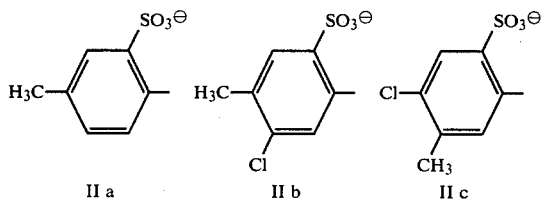

and $M^\oplus$ is $Li^\oplus$, $Na^\oplus$, $K^\oplus$ or $NH_4^\oplus$ for the coloring of thermoplastics.

We have found, surprisingly, that the compounds of the formula I, which are usually only prepared as intermediates, are exceptionally suitable for the mass-coloring of thermoplastics. Suitable thermoplastics are, in particular, polyolefins, eg. polyethylene or polypropylene, plasticized PVC, copolymers of vinyl chloride and vinyl acetate or of vinyl chloride and vinyl ethers, polystyrene and styrene copolymers. Other suitable plastics are rigid PVC, polyesters and nylon.

The compounds are used in the conventional concentrations for the coloring of plastics, ie. from about 0.01 to 5%, and give brilliant colorations, ranging from transparent to opaque, which are distinguished, surprisingly, by very good fastness to plasticizer and very good heat stability, coupled with satisfactory lightfastness. Compared to the alkaline earth metal salts and manganese salts conventionally used, they offer the advantage of a broader range of hues, and/or of being toxicologically safe. These advantages also apply in comparison with the metal compounds disclosed in German Laid-Open Application DOS No. 2,629,639. At the same time, the compounds to be used according to the invention are also simpler to prepare.

The compounds of the formula I are furthermore exceptionally suitable for the preparation of color masterbatches, ie. mixtures of plastic and colorant containing a very high proportion of the latter, for example from 10 to 60%, preferably from 20 to 40%. Preferred plastics are polyethylene and vinyl chloride polymers, more especially copolymers with a vinyl ether. Details of the preparation of the pigment masterbatches or color masterbatches may be found in the Examples.

The compounds of the formula I are obtained by the conventional methods, using diazotization and coupling. The use of the ammonium salts and more especially of the sodium salts, in particular of compounds where D is

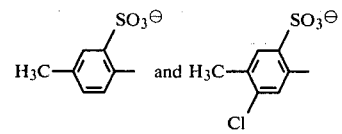

is preferred.

In the Examples which follow, parts and percentages are by weight, unless stated otherwise.

EXAMPLE 1

18.7 parts of p-toluidiene-3-sulfonic acid and 19.5 parts of β-hydroxynaphthoic acid are dissolved in 400 parts of water and 17 parts of 50% strength sodium hydroxide solution. After having added 110 parts of 5 N hydrochloric acid and 250 parts of ice, diazotization is carried out at 0°–5° C. with 35 parts of 3 N sodium nitrite solution. The mixture is stirred for a further 30 minutes at 0°–5° C., the excess nitrite is destroyed with amidosulfonic acid, and the pH is brought to 10.3 with 20% strength sodium hydroxide solution.

The mixture is stirred for 1 hour at room temperature and 2 hours at 70° C. The sodium salt formed is filtered off, washed chloride-free with water and dried. 42 parts of a yellowish red powder are obtained.

EXAMPLES 2–9

A parts of an amine of the formula III a, b or c and 19.5 parts of β-hydroxynaphthoic acid are dissolved in 400 parts of water and B parts of a C % strength aqueous solution of a hydroxide MOH. After adding 110 parts of 5 N hydrochloric acid and 250 parts of ice, diazotization is carried out at 0°–5° C. with D parts of an aqueous 5 N solution of the nitrite of the formula R—NO₂. The mixture is stirred for a further 30 minutes at 0°–5° C., excess nitrite is destroyed with amidosulfonic acid and the pH is brought to 10.3 with the C % strength aqueous solution of the hydroxide MOH.

The mixture is stirred for 1 hour at room temperature and 2 hours at 70° C. The pigment formed is filtered off, washed chloride-free with water and dried. E parts of a red powder are obtained.

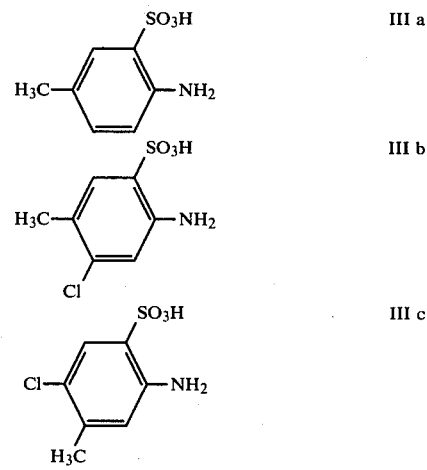

| Example | A | Amine | B | C | M | D | R | E |
| --- | --- | --- | --- | --- | --- | --- | --- | --- |
| 2 | 18.7 | III a | 53 | 10 | Li | 26 | Na | 38 |

-continued

| Example | A | Amine | B | C | M | D | R | E |
|---|---|---|---|---|---|---|---|---|
| 3 | 18.7 | III a | 46.4 | 30 | K | 27 | K | 44 |
| 4 | 22.2 | III b | 53 | 10 | Li | 26 | Na | 41 |
| 5 | 22.2 | III b | 30 | 30 | Na | 26 | Na | 44 |
| 6 | 22.2 | III b | 42 | 30 | K | 27 | K | 47 |
| 7 | 22.2 | III c | 53 | 10 | Li | 26 | Na | 42 |
| 8 | 22.2 | III c | 30 | 30 | Na | 26 | Na | 44 |
| 9 | 22.2 | III c | 48 | 30 | K | 27 | K | 47 |

EXAMPLE 10

18.7 parts of p-toluidine-3-sulfonic acid and 19.5 parts of β-hydroxynaphthoic acid are dissolved in 400 parts of water and 25 parts of 25% strength ammonia. After adding 110 parts of 5 N hydrochloric acid and 250 parts of ice, diazotization is carried out at 0°–5° C. with 40 parts of 3 N ammonium nitrite solution. The mixture is stirred for a further 30 minutes at 0°–5° C., the excess nitrite is destroyed with amidosulfonic acid and the pH is brought to 8.5–9 with 25% strength ammonia.

The batch is stirred for 1 hour at room temperature and 2 hours at 70° C. The pigment formed is filtered off, washed chloride-free with water and dried. 40 parts of a red powder are obtained.

EXAMPLE 11

The procedure described in Example 10 is followed, but instead of 18.7 parts of p-toluidine-3-sulfonic acid, 22.2 parts of 1-amino-3-chloro-4-methylbenzene-6-sulfonic acid are used.

43 parts of a red powder are obtained.

EXAMPLE 12

The procedure described in Example 10 is followed, but instead of 18.7 parts of p-toluidine-3-sulfonic acid, 22.2 parts of 1-amino-3-methyl-4-chlorobenzene-6-sulfonic acid are used.

42 parts of a red powder are obtained.

EXAMPLE 13

Plasticized PVC; 0.1% strength coloration.

0.05 part of colorant obtained as described in Example 1 and 50 parts of a mixture, itself obtained from 65 parts of polyvinyl chloride powder, 35 parts of diethylhexyl phthalate and 2 parts of dibutyl-tin bis-(hexyl thioglycolate) are homogenized on a mill in about 8 minutes at 150°–160° C. and hides are produced on the mill and polished on a calender. Luminous yellowish red very opaque hides are obtained, the color being very fast to plasticizer.

If instead of the colorant of Example 1, those of Examples 2–12 are used, similar colorations are obtained.

EXAMPLE 14

Plasticized PVC; 1:10 reduction.

0.25 part of colorant, obtained as described in Example 5, 2.5 parts of titanium dioxide (rutile grade) and 50 parts of a mixture, itself obtained from 65 parts of polyvinyl chloride powder, 36 parts of di-ethylhexyl phthalate and 2 parts of dibutyl-tin bis-(hexyl thioglycolate), are homogenized on a mill in about 8 minutes at 150°–160° C. and hides are produced on the mill and polished on a calender. Yellowish red hides are obtained, the coloration having excellent fastness to plasticizer.

If instead of the colorant of Example 5 those of Examples 1–4 and 6–12 are used, similar colorations are obtained.

EXAMPLE 15

Plasticized PVC; 2:1 reduction.

If the procedure described in Example 14 is employed, but 0.5 part of colorant is used instead of 0.25 part, and 0.25 part of titanium dioxide is used instead of 2.5 parts, brilliant red hides are obtained, the coloration having excellent fastness to plasticizer.

EXAMPLE 16

Polyethylene, 0.05% strength coloration.

0.05 part of colorant, obtained as described in Example 10, is dry-blended in a drum mixer with 100 parts of high pressure polyethylene powder. The mixture is melted and homogenized on an extruder at a barrel temperature of 160°–200° C. The colored plastic is granulated by die-face cutting or by drawing strands which are cooled and granulated. The granules thus obtained are then injection-molded at 200° C. or compression-molded into a variety of shapes. Luminous red moldings are obtained.

Similar colorations are obtained if instead of the colorant of Example 10 those of Examples 1–9 and 11–12 are used.

EXAMPLE 17

Polyethylene, 1:10 reduction.

0.1 part of the colorant of Example 8, 100 parts of high pressure polyethylene powder and 1 part of titanium dioxide (rutile grade) are mixed, and converted to moldings, as described in Example 16. Red moldings are obtained.

If the colorants of Examples 1–7 and 9–12 are used instead of the colorant of Example 8, similar colorations are obtained.

EXAMPLE 18

Polyethylene pigment masterbatch.

30 parts of colorant obtained as described in Example 11 are mixed with 70 parts of polyethylene powder and the mixture is homogenized for one hour in a heated kneader at 140° C. and then granulated. A luminous red pigment masterbatch is obtained.

Similar masterbatches are obtained if instead of the colorant of Example 11 the colorants of Examples 1–10 and 12 are used.

EXAMPLE 19

Polypropylene, 0.1% strength coloration.

0.1 part of colorant, obtained as described in Example 1, is dry-blended in a drum mixer with 100 parts of polypropylene powder. The mixture is melted and homogenized on an extruder at a barrel temperature of 240° C. The colored plastic is granulated by die-face cutting or by drawing strands which are granulated. The granules thus obtained are then injection-molded at 200° C. or compression-molded into a variety of shapes. Luminous red moldings are obtained.

Similar colorations are obtained if instead of the colorant of Example 1 those of Examples 2–12 are used.

EXAMPLE 20

Rigid PVC; 0.1% strength coloration.

0.1 part of colorant, obtained as described in Example 7, 100 parts of polyvinyl chloride powder (suspension polymer or emulsion polymer) and 2 parts of dibutyl-tin bis-(hexyl thioglycolate) are homogenized in about 8 minutes on a mixing mill at 150°-160° C.

The mill haldes obtained are pressed to form sheets on a platen press at 140° C. under about 0.4 kg/cm². Red pressings are obtained. Instead of the colorant of Example 7, those of Examples 1-6 and 8-12 may also be used.

EXAMPLE 21

Rigid PVC; 1:10 reduction.

0.1 part of colorant obtained as described in Example 2, 100 parts of polyvinyl chloride powder (suspension polymer or emulsion polymer), 1 part of titanium dioxide (rutile grade) and 2 parts of dibutyl-tin bis-(hexyl thioglycolate) are homogenized on a mixing mill, as described in Example 20 and then pressed to form sheets. Luminous red pressings are obtained.

If instead of the colorant of Example 2, those of Examples 1 and 3-12 are used, similar colorations are obtained.

EXAMPLE 22

Rigid PVC; 2:1 reduction.

1 part of colorant, obtained as described in Example 1, 100 parts of polyvinyl chloride powder (suspension polymer or emulsion polymer), 0.5 part of titanium dioxide (rutile grade) and 2 parts of dibutyl-tin bis-(hexyl thioglycolate) are homogenized in about 8 minutes on a mixing mill at 150°-160° C. The mill hides obtained are pressed to form sheets on a platen press at 140° C. under about 0.4 kg/cm². Luminous red pressings are obtained.

Similar colorations are obtained if instead of the colorant of Example 1, those of Examples 2-12 are used.

EXAMPLE 23

Polystyrene, 0.05% strength coloration.

0.05 part of colorant obtained as described in Example 1 is dry-blended with 100 parts of milled polystyrene block polymer in a drum mixer. The mixture is melted and homogenized on an extruder at a barrel temperature of 200°-250° C. The colored plastic is granulated by die-face cutting or by drawing strands which are cooled and granulated. The granules thus obtained are then injection-molded at 200°-250° C. or compression-molded into a variety of shapes. Luminous red opaque moldings are obtained.

Instead of a polystyrene block polymer, a polystyrene emulsion polymer or suspension polymer, or a styrene copolymer with butadiene and acrylonitrile or acrylic esters may be used. Equally, the colorants of Examples 2-12 may be used in place of the colorant of Example 1.

EXAMPLE 24

Polystyrene, 1:10 reduction.

0.1 parts of the colorant of Example 5 is mixed with 100 parts of milled polystyrene block polymer and 1 part of titanium dioxide, as described in Example 17. The mixture is melted, homogenized and granulated. The granules obtained are injection-molded or compression-molded at 200°-250° C. Luminous red injection moldings or compression moldings are obtained.

Similar colorations are obtained if instead of the colorant of Example 5 those of Examples 1-4 and 6-12 are used.

EXAMPLE 25

PVC masterbatch.

180 parts of vinyl chloride/vinyl isobutyl ether copolymer are plasticized at about 120°-150° C. in a preheated floating-weight kneader. 480 parts of a 25% strength moist press cake of the colorant of Example 1 are added in portions to the plastic mass and the mixture is kneaded until the water has evaporated. After the material has cooled, it is comminuted and milled on a pin-disk mill. A luminous red pigment masterbatch is obtained.

Similar masterbatches are also obtained with the other colorants described in the Preparation Examples.

EXAMPLE 26

Vinyl chloride/vinyl acetate copolymer masterbatch.

200 parts of a copolymer based on vinyl chloride and vinyl acetate are plasticized in a kneader at 90°-110° C. 113 parts of colorant, obtained as described in Example 8, are then added in portions and the mixture is kneaded for 1 hour at 125°-130° C., small amounts of water being added initially. When the mixture has cooled, it is first coarsely comminuted and the milled to give a fine brilliant red powder.

Similar masterbatches are obtained if instead of the colorant of Example 8 those of Examples 1 to 7 and 9 to 12 are employed.

We claim:

1. A process for the coloring of thermoplastics, wherein a compound of the general formula

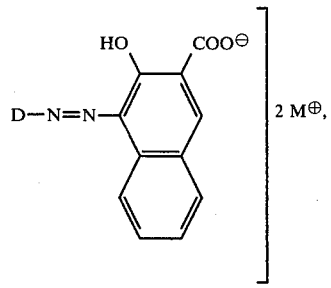

where D is a radical of the formula

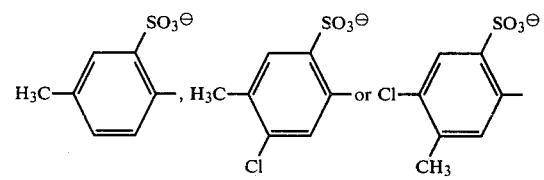

and $M^\oplus$ is $Li^\oplus$, $Na^\oplus$, $K^\oplus$ or $NH_4^\oplus$, is used.

2. A process as claimed in claim 1, wherein the thermoplastic is colored with a sodium salt or ammonium salt.

3. A pigment masterbatch or dye masterbatch, which contains a plastic and a colorant of the formula given in claim 1, the concentration of the said colorant being from 10 to 60%, preferably from 20 to 40%.

4. A concentrate as claimed in claim 3, wherein the plastic is polyethylene or PVC.

* * * * *